United States Patent [19]

Kawasaki et al.

[11] Patent Number: 5,021,534

[45] Date of Patent: Jun. 4, 1991

[54] THERMOSETTING URETHANE ELASTOMER

[75] Inventors: Masahiro Kawasaki; Yukio Ohbuchi; Yoshiaki Maeda; Susumu Sato, all of Yokohama, Japan

[73] Assignee: Nippon Polyurethane Industry Co., Ltd., Tokyo, Japan

[21] Appl. No.: 544,820

[22] Filed: Jun. 27, 1990

Related U.S. Application Data

[63] Continuation of Ser. No. 267,444, Nov. 4, 1988, abandoned.

[30] Foreign Application Priority Data

Nov. 11, 1987 [JP] Japan ................................. 62-28299

[51] Int. Cl.$^5$ ..................... C08G 18/10; C08G 18/65
[52] U.S. Cl. ......................................... 528/60; 528/65; 528/66
[58] Field of Search ............................ 528/60, 65, 66

[56] References Cited

U.S. PATENT DOCUMENTS

| | | |
|---|---|---|
| 3,016,364 | 1/1962 | Muller .................................... 528/65 |
| 3,658,746 | 4/1972 | Rosendahl et al. . |
| 3,716,519 | 2/1973 | Yoda et al. . |
| 4,086,211 | 4/1978 | Nakauchi et al. ..................... 528/76 |

FOREIGN PATENT DOCUMENTS

| | | |
|---|---|---|
| 4721592 | 6/1969 | Japan . |
| 4925427 | 6/1974 | Japan . |
| 60-59249 | 7/1985 | Japan . |

*Primary Examiner*—John Kight, III
*Assistant Examiner*—Dennis R. Daley
*Attorney, Agent, or Firm*—Davis Hoxie Faithfull & Hapgood

[57] ABSTRACT

A thermosetting urethane elastomer is prepared from:
(a) a prepolymer having isocyanate groups at terminal ends obtained by allowing p-phenylene diisocyanate to react with a compound having 2 or more active hydrogens, and
(b) curing agents of 1,4-bis(2-hydroxyethoxy)benzene and trimethylolpropane or 1,4-bis(2-hydroxyethoxy)-benzene and a polyol having isocyanurate ring.

18 Claims, No Drawings

THERMOSETTING URETHANE ELASTOMER

This is a continuation of copending application Ser. No. 07/267,444 filed on 11/4/88, now abandoned.

BACKGROUND OF THE INVENTION

1. Field of the Invention

This invention relates to a thermosetting urethane elastomer, more particularly to a thermosetting urethane elastomer prepared from a prepolymer containing isocyanate groups at terminal ends obtained from p-phenylene diisocyanate (hereinafter abbreviated as PPDI) and a polyol and a curing agent comprising specific polyols.

2. Related Background Art

Thermosetting urethane elastomers are generally produced according to (a) the method in which a prepolymer contaInIng Isocyanate groups at terminal ends derived from a diisocyanate such as tolylene diisocyanate, diphenylmethane diisocyanate (hereinafter abbreviated as MDI), hexamethylene diisocyanate, etc. and a polyol such as polyether polyol, polyester polyol or polycaprolactone polyol, etc. is cured with a curing agent of a glycol such as 1,4-butylene glycol (hereinafter abbreviated as 1,4-BG) or an amine such as 3,3'-dichloro-4,4'-diaminodiphenyl-methane, or (b) the method in which an unstable prepolymer derived from 1,5-naphthalene diisocyanate (hereinafter abbreviated as NDI) and a polyester polyol is rapidly cured with a glycol such as 1,4-BG, etc.

These thermosetting urethane elastomers are highly elastic, having excellent tensile strength, etc., and have been widely used for rolls, solid tires, belts, etc. However, the elastomer obtaIned in the above method (a) is inferior in heat resistance to be greatly changed in hardness depending on the temperature, and therefore unsuitable for use in a place which becomes elevated temperature or a place where the temperature is greatly changed. On the other hand, the prepolymer obtained in the above method (b) is excellent in heat resistance, but since an unstable prepolymer is used, drawbacks are involved in equipment during production and restriction in time.

SUMMARY OF THE INVENTION

The present inventors, in order to improve heat resistance, change in physical properties depending on temperature of thermosettIng urethane elastomers, have studied and investigated intensively about combinations of various prepolymers containing isocyanate groups at terminal ends comprising diisocyanate and polyol with various curing agents, and consequently found that they can be improved by a combination of a specific diisocyanate with a specific curing agent, to accomplish the present invention.

According to the present invention, there is provided a thermosetting urethane elastomer prepared from:
(a) a prepolymer having isocyanate groups at terminal ends obtained by alloWing PPDI to react with a compound having 2 or more active hydrogens, and
(b) curing agents comprising 1,4-bis(2-hydroxyethoxy)-benzene (hereinafter abbreviated as BHEB) and trimethylolpropane (hereinafter abbreviated as TMP) or BHEB and a polyol having isocyanurate ring.

DETAILED DESCRIPTION OF THE PREFERRED EMBODIMENTS

In the present invention, as the result of investigation about the starting materials for improving heat resistance of thermosetting urethane elastomers, it has been found that PPDI is preferable as the diisocyanate. PPDI is an aromatic diisocyanate having isocyanate groups at the 1- and 4-positions on the benzene ring, and its melting point is 95° C.

Such prepolymer containing isocyanate groups at terminal ends obtained from PPDI and polyol was cured with various curing agents, and heat resistance and temperature dependency, etc. of the cured product were measured. As the result, by use of BHEB and TMP or BHEB and a polyol having isocyanurate ring as the curing agents, a thermosetting urethane elastomer having excellent physical properties was obtained.

The thermosetting urethane elastomer consisting only of said prepolymer and BHEB, although excellent in heat resistance, has the drawback that its compression set is large. The thermosetting urethane elastomer according to the present invention is also improved in compression set simultaneously with heat resistance.

The compounds having two or more active hydrogens which can be used for obtaining the prepolymer having isocyanate groups at terminal ends in the present invention have an average molecular eight of 62 to 6000, preferably 1000 to 3000. Among them, polyester polyol, polyether polyol, polycarbonate polyol, polyacrylic polyol, polyamine, etc. are included.

As the polyester polyol, there may be employed polyester polyols obtained by polycondensation of glycol such as ethylene glycol, 1,2-propylene glycol, 1,3-propylene glycol, 1,3-butylene glycol, 1,4-BG, 2,2-dimethyl 1,3-propane diol, diethylene glycol, 1,5-pentane diol, 3-methyl-1,5-pentane diol, 1,6-hexane diol, cyclohexane-1,4-diol, cyclohexane-1,4-dimethanol, etc. alone or a mixture of these with a dibasic acid such as succinic acid, maleic acid, adipic acid, glutaric acid, pimellic acid, suberic acid, azelaic acid, sebacic acid, phthalic acid, isophthalic acid, terephthalic acid, hexahydrophthalic acid, hexahydroisophthalic acid, etc. alone or a mixture of these, and, acid esters, acid halides of these, and mixtures of these polyester polyols and the above glycols, and further lactone type polyols such as polycaprolactone diols obtained by subjecting lactones such as ε-caprolactone, etc. to ring-opening addition polymerization in the presence of a glycol, etc.

As the polyether polyol, there may be employed hydroxyl-containing polyether polyols made by the addition polymerization of alkylene oxide such as ethylene oxide, propylene oxide, etc. to glycols such as ethylene glycol, 1,2-propylene glycol, diethylene glycol, polyethylene glycol, etc., polyols having 3 or more functional groups such as glycerine, trimethylolethane, TMP, pentaerythritol, etc., polyamines such as ethylenediamine, toluenediamine, etc., either alone or as a mixture of two or more kinds.

Further, as the polycarbonate polyol, it can be obtained by the reaction of a dialkyl carbonate, an alkylene carbonate or a diaryl carbonate, etc. with a hydroxyl compound, for example, 1,4-BG, 1,6-hexane diol, etc., and these can be also used either alone or as a mixture of two or more kinds.

The curing agents which can be used in the present invention are BHEB and TMP or BHEB and a polyol containing isocyanurate ring, etc. The mole ratio of BHEB and TMP or BHEB and the polyol containing isocyanurate ring ranges from 9.5:0.5 to 1,9, preferably from 9:1 to 2:8. The ratio influences various physical properties of thermosetting urethane elastomer such a hardness, tensile strength, compression set etc. Accordingly, any thermosetting urethane elastomer having desired properties can be prepared by changing the above mentioned ratio.

As said polyol containing isocyanurate ring, there may be included tris-$\beta$-hydroxyethylisocyanurate (hereinafter abbreviated as THEIC) and/or a polyol containing isocyanurate ring obtained by addition of 1 to 3 moles of caprolactone to 1 mole of THEIC, for example, Placcel E-212 produced by Daicel Co.

Such polyol containing isocyanurate ring is represented by the following formula (1):

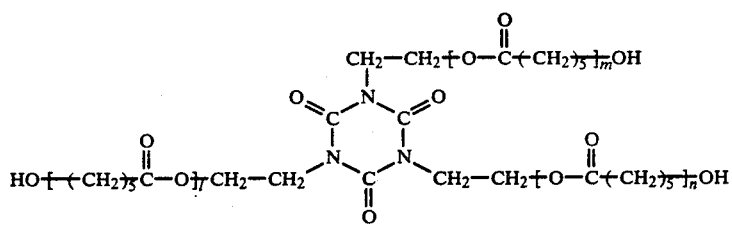

where $l, m, n = 0 \sim 1$, $0 \leq l + m + n \sim 3$.

The preparation of the prepolymer having isocyanate groups at terminal ends in the present invention can be typicaly practiced according to such methods as follows.

(A) By use of a twin screw extruder, solid PPDI and a liquid polyol are fed quantitatively at a predetermined molar ratio at a cylinder temperature of 70° to 180° C. to carry out continuous synthesis.

(B) A predetermined amount of a polyol is charged into the reaction batch, and after adjustment of temperature range from 100° to 130° C., a predetermined amount of PPDI is charged under solid state and synthesis is carried out under stirring.

(C) A predetermined amount of solid PPDI and a part of a polyol are charged into the reaction batch, and while the reaction is carried out at 70 to 100° C. the remainder of the polyol is charged in several divided portions, and synthesis is carried out while repeating the reaction.

It is required that the reaction between the organic polyisocyanate and the active hydrogen-containing compound should be conducted so that the isocyanate group content in the prepolymer should be 2 to 20% by weight, preferably 3 to 10% by weight. If the isocyanate content in the prepolymer obtained becomes greater than 20% by weight, free PPDI becomes increased in amount, whereby storage stability of the prepolymer will be inferior. On the other hand, if it is smaller than 2% by weight, the isocyanate content as the prepolymer is low and the viscosity becomes very high, whereby the prepolymer can be handled with difficulty.

The thermosetting urethane elastomer of the present invention can be prepared by setting the NCO equivalent of said prepolymer and the OH equivalent of the curing agent at a ratio of 1:0.8 to 1:0.95, adjusting said prepolymer temperature at 110° to 130° C., the curing agent temperature at 110° to 120° C. and the mold temperature at 120° to 130° C., stirring predetermined amounts of the prepolymer and the curing agents, and degassing the mixture under reduced pressure prior to casting into the mold, followed by heating for 8 to 15 hours. When a dispersing machine is to be used, it is necessary to perform degassing under reduced pressure before mixing the prepolymer with the curing agent.

According to the present invention, heat resistance and lowering in physical properties by temperature, etc. which have been the drawbacks of the thermosetting urethane elastomer could be improved by a composition comprising a prepolymer containing isocyanate groups at terminal ends by use of PPDI as the diisocyanate and, as the curing agents, BHEB and TMP or BHEB and a polyol containing isocyanurate ring. Particularly, in the physical properties, also concerning compression set which has been deemed to be improved with difficulty, it could be also improved to better than the performance exhibited by the thermosetting urethane elastomer of the prior art.

The thermosetting urethane elastomer of the present invention can broaden its uses to the place which becomes elevated temperatures or the place where the temperature change is great, where thermosetting urethane elastomers could not be employed in the prior art. Specific examples of such uses may include roll for paper making, printing roll and rolls for other OA instruments, further cleaning blade, various belts, O-ring, sealing material such as bush, vibration insulator, solid tire, wheel for caster, snow plow, etc.

The present invention is described below in more detail by referring to Examples. In Examples, "parts" and "%" are respectively "parts by weight" and "% by weight", unless otherwise noted.

EXAMPLE 1

Synthesis of prepolymer

PPDI which is solid at ordinary temperature at a ratio of 0.288 mol/min. and a polycaprolactone polyol (average molecular weight 2000, functionality 2) heated to 80° C. at a ratio of 0.144 mol/min. were fed into a twin-screw extruder at a screw rotational number of 150 rpm, with cylinder temperatures of 80° C. at the feed portion, 120° to 150° C. at the middle portion and 80° C. at the outlet portion, to obtain a prepolymer. The prepolymer was found to have an NCO content of 3.6%.

Resin formation

BHEB/TMP at a weight ratio of 5.80/1.00 was completely mixed and dissolved at 120° C. to provide a curing agent.

The above prepolymer and the curing agent were adjusted to 110° C. and a mold to 120° C., 100 g of the prepolymer and 6.8 g of the curing agent were well stirred and poured into the mold after degassing under reduced pressure. After casting, heating was effected at 120° C. for 10 hours to obtain a thermosetting urethane elastomer. The urethane elastomer was left to stand at 25° C. for 7 days, and then provided for various tests.

The results are shown in Table 1 (physical properties under normal state, hereinafter the same), Table 2 (heat aging test, hereinafter the same) and Table 3 (temperature dependency of hardness, hereinafter the same).

EXAMPLE 2

Synthesis of prepolymer

The prepolymer obtained in Example 1 was used.

Resin formation

BHEB/E-212*1) at a weight ratio of 1.26/1.00 was completely mixed and dissolved to provide a curing agent.

The above prepolymer and the curing agent were adjusted 110° C. and a mold to 120° C., 100 g of the prepolymer and 10.4 g of the curing agent were well stirred and poured into the mold after degassing under reduced pressure. After casting, heating was effected at 120° C. for 10 hours to obtain a thermosetting urethane elastomer. The urethane elastomer was left to stand at 25° C. for 7 days, and then provided for various tests. The results are shown in Table 1 to Table 3.

*1) Polyol containing isocyanurate ring, produced by Daicel Co.

EXAMPLE 3

Synthesis of prepolymer

PPDI which is solid at ordinary temperature at a ratio of 0.505 mol/min. and a polytetramethylene glycol (average molecular weight 1000, functionality 2) heated to 80° C. at a ratio of 0.253 mol/min. were fed into a twin-screw extruder at a screw rotational number of 150 rpm, with cylinder temperatures of 80° C. at the feed portion, 120° to 150° C. at the middle portion and 80° C. at the outlet portion, to obtain a prepolymer. The prepolymer was found to have an NCO content of 6.3%.

Resin information

By use of the curing agent in Example 1, the above prepolymer and the curing agent were adjusted to 110° C. and a mold to 120° C., 100 g of the prepolymer and 12.0 g of the curing agent were well stirred and poured into the mold after degassing under reduced pressure. After casting, heating gas effected at 120° C. for 10 hours to obtain a thermosetting urethane elastomer. The urethane elastomer was left to stand at 25° C. for 7 days, and then provided for various tests. The results are shown in Table 1 to Table 3.

EXAMPLE 4

Synthesis of prepolymer

The prepolymer obtained in Example 3 was used.

Resin formation

The curing agent shown in Example 2 was used.

The prepolymer and the curing agent were adjusted to 110° C. and a mold to 120° C., 100 g of the prepolymer and 18.2 g of the curing agent were well stirred and poured into the mold after degassing under reduced pressure. After casting, heating gas effected at 120° C. for 10 hours to obtain a thermosetting urethane elastomer. The urethane elastomer was left to stand at 25° C. for 7 days, and then provided for various tests. The results are shown in Table 1 to Table 3.

COMPARATIVE EXAMPLE 1

As the prepolymer, &he same prepolymer as in Example 1 was employed.

Resin formation

The prepolymer was adjusted to 75° C., 1,4-BG to 25° C. and a mold to 120° C., and 100 g of the prepolymer and 3.7 g of 1,4-BG were well stirred and poured into the mold after degassing under reduced pressure. After casting, heating was effected at 120° C. for 5 hours to obtain a thermosetting urethane elastomer. The urethane elastomer was left to stand at 25° C. for 7 days, and then provided for various tests. The results are shown in Table 1 to Table 3.

COMPARATIVE EXAMPLE 2

As the prepolymer, the same prepolymer as in Example 3 was employed.

Resin formation

Under the same temperature conditions as in Comparative example 1, 100 g of the prepolymer and 6.4 g of 1,4-BG were well stirred and poured into the mold after degassing under reduced pressure. After casting, heating was effected at 120° C. for 5 hours to obtain a thermosetting urethane elastomer. The urethane elastomer was left to stand at 25° C. for 7 days, and then provided for various tests. The results are shown in Table 1 to Table 3.

COMPARATIVE EXAMPLE 3

Synthesis of prepolymer

Into a four necked round bottomed flask equIpped with a stirrer, a thermometer, a pipe for nitrogen seal, etc., 2.00 mol of MDI and 1.00 mol of a polycaprolactone polyol (average molecular weight 1,000, functionality 2) were charged and the reaction was carried out under nitrogen seal at 65° to 75° C. for 3 hours. The prepolymer obtained was found to have an NCO content of 5.6%.

Resin Information

Under the same temperature conditions as in Comparative example 1, 100 g of the prepolymer and 5.7 g of 1,4-BG were well stirred and poured into the mold after degassing under reduced pressure. After casting heating was effected at 120° C. for 5 hours to obtain a thermosetting urethane elastomer. The urethane elastomer was left to stand at 25° C. for 7 days, and then provided for various tests. The results are shown in Table 1 to Table 5.

COMPARATIVE EXAMPLE 4

Into the same round bottomed flask as in Comparative example 3 was charged 1.00 mol of a polyethylene adipate (average molecular weight 2000, functionality 2) and the temperature was adjusted to 120° C. To the polyethylene adipate was added 2.00 mol of solid NDI, and the reaction was carried out under stirring without heating until the temperature became 90° C. The prepolymer obtained was found to have an NCO content of 3.5%.

Resin formation

The prepolymer was adjusted to 100° C., 1,4-BG to 25° C. and a mold to 120° C. and 100 g of the prepolymer and 3.6 g of 1,4-BG were well stirred and poured into the mold after degassing under reduced pressure. After casting, heating was effected at 120° C. for 6 hours to obtain a thermosetting urethane elastomer. The urethane elastomer was left to stand at 26° C. for 7 days, and then provided for various tests. The results are shown in Table 1 to Table 3.

COMPARATIVE EXAMPLE 5

Synthesis of prepolymer

The prepolymer obtained in Comparative example 3 was used.

Resin formation

By use of the curing agent of Example 1, and similarly under the same temperature conditions as in Example 1, 100 g of the prepolymer and 10.3 g of the curing agent were well stirred and poured into the mold after degassing under reduced pressure. After casting, heating was effected at 120° C. for 10 hours to obtain a thermosetting urethane elastomer. The urethane elastomer was left to stand at 25° C. for 7 days, and then provided for various tests. The results are shown in Table 1 to Table 3.

EXAMPLE 5

Synthesis of prepolymer

PPDI which is solid at ordinary temperature at a ratio of 0.437 mol/min. and a polycaprolactone polyol (average molecular weight 1200, functional group number 2) heated to 80° C. at a ratio of 0.219 mol/min. were fed into a twin-screw extruder at a screw rotational number of 150 rpm, with cylinder temperatures of 80° C. at the feed portion, 120° to 150° C. at the middle portion and 80° C. at the outlet portion, to obtain a prepolymer. The prepolymer was found to have an NCO content of 5.5 %.

EXAMPLE 6

Synthesis of prepolymer

The prepolymer obtained in Example 5 was used.

Examples 7~10

Synthesis of prepolymer

The prepolymer obtained in Example 1 was used.

EXAMPLES 5~10

Resin formation

The resin formation in Examples 5~10 was carried out by change of the ratio of BHEB/TMP or BHEB/E-212 as shown in Table 4 in which the ratio of the prepolymer to the curing agent are further shown. The procedure for the casting to mold and the conditions after molding were the same as in Example 1. Table 5 shows the physical properties under normal state of the thermosetting urethane elastomers obtained in Examples 5~10.

TABLE 1

| | | | | | No. | | | | |
|---|---|---|---|---|---|---|---|---|---|
| | Example | | | | Comparative example | | | | |
| Item | 1 | 2 | 3 | 4 | 1 | 2 | 3 | 4 | 5 |
| Hardness (JIS.A) | 85 | 84 | 94 | 93 | 92 | 97 | 82 | 91 | 89 |
| 100% Modulus (Kg/cm$^2$) | 59 | 46 | 121 | 106 | 86 | 125 | 85 | 69 | 77 |
| 300% Modulus (Kg/cm$^2$) | 165 | 88 | 213 | 167 | 113 | 149 | 165 | 100 | 224 |
| Tensile strenngth (Kg/cm$^2$) | 427 | 472 | 217 | 294 | 387 | 352 | 519 | 361 | 525 |
| Elongation (%) | 380 | 550 | 300 | 440 | 830 | 780 | 600 | 850 | 380 |
| Tear strength[1] (Kg/cm) | 68 | 72 | 82 | 88 | 139 | 133 | 140 | 112 | 69 |
| Compression set[2] (%) | 29 | 20 | 29 | 28 | 45 | 34 | 35 | 29 | 41 |
| Bashore Rebound elasticity (%) | 73 | 73 | 67 | 62 | 69 | 66 | 43 | 55 | 21 |

Measurement method: according to JIS K-6301
[1]Test strip: B-type
[2]Conditions: 25% compression, 70° C. × 22 Hr

TABLE 2

| | | Lapse of time | | | |
|---|---|---|---|---|---|
| No. | | 3 days | 1 week | 2 weeks | 4 weeks | 8 weeks |
| Example | 1 | 109.0 | 100.4 | 83.8 | 52.4 | 48.4 |
| | 2 | 105.5 | 98.9 | 85.5 | 56.6 | 46.8 |
| | 3 | 74.3 | 55.4 | 45.0 | 39.9 | 35.1 |
| | 4 | 72.9 | 56.8 | 45.3 | 40.8 | 33.4 |
| Comparative example | 1 | 82.5 | 50.8 | 34.9 | 33.6 | 21.1 |
| | 2 | 53.3 | 31.6 | 24.5 | 22.2 | 18.5 |
| | 3 | 70.4 | 43.3 | 29.2 | 20.0 | 17.5 |
| | 4 | 89.9 | 68.3 | 35.5 | 35.0 | 33.3 |
| | 5 | 103.1 | 96.2 | 62.9 | 31.2 | 20.0 |

Measurement method: according to JIS K-6301
Heat aging test (150° C.), Tensile strength retentivity

TABLE 3

| | | | | | | No. | | | | |
|---|---|---|---|---|---|---|---|---|---|---|
| Measurement | | Example | | | | Comparative example | | | | |
| temperature | | 1 | 2 | 3 | 4 | 1 | 2 | 3 | 4 | 5 |
| Hardness (JIS.A) | −25° C. | 90 | 88 | 95 | 93 | 99 | 98 | 93 | 94 | 99 |
| | 25° C. | 85 | 84 | 94 | 93 | 92 | 97 | 82 | 91 | 89 |
| | 70° C. | 82 | 82 | 94 | 93 | 90 | 95 | 77 | 88 | 84 |
| | 120° C. | 81 | 81 | 93 | 92 | 89 | 93 | 74 | 87 | 80 |
| | 150° C. | 79 | 79 | 93 | 92 | 84 | 90 | 67 | 81 | 75 |

Measurement method: according to JIS K-6301

TABLE 4

| | | No. Example | | | | | |
|---|---|---|---|---|---|---|---|
| | | 5 | 6 | 7 | 8 | 9 | 10 |
| Curing agent | Composition Ratio by | BHEB/TMP 13.29/1.00 | BHEB/TMP 5.90/1.00 | BHEB/TMP 3.44/1.00 | BHEB/TMP 1.48/100 | BHEB/E-212 1.30/1.00 | BHEB/E-212 0.08/1.00 |

TABLE 4-continued

| | | Example No. | | | | | |
|---|---|---|---|---|---|---|---|
| | | 5 | 6 | 7 | 8 | 9 | 10 |
| | weight (The value in parentheses shows mole ratio) | (9/1) | (8/2) | (7/3) | (5/5) | (8/2) | (2/8) |
| Resin formation | Prepolymer (parts) | 100 | 100 | 100 | 100 | 100 | 100 |
| | Curing agent (parts) | 11.4 | 10.5 | 6.3 | 5.4 | 10.4 | 15.3 |

TABLE 5

| | Example No. | | | | | |
|---|---|---|---|---|---|---|
| Item | 5 | 6 | 7 | 8 | 9 | 10 |
| Prepolymer | PCL-1200/ PPDI (R=2) | PCL-1200/ PPDI (R=2) | The same as in Example 1 | The same as in Example 1 | The same as in Example 1 | The same as in Example 1 |
| Curing agent (mole ratio) | BHEB/TMP = 9/1 | BHEB/TMP = 8/2 | BHEB/TMP = 7/3 | BHEB/TMP = 5/5 | BHEB/E-212 = 8/2 | BHEB/E-212 = 2/8 |
| Hardness (JIS.A) | 95 | 90 | 80 | 70 | 85 | 60 |
| 100% Modulus (kg/cm$^2$) | 99 | 93 | 48 | 28 | 46 | 16 |
| 300% Modulus (kg/cm$^2$) | 129 | 149 | 201 | — | 88 | 38 |
| Tensile strength (kg/cm$^2$) | 631 | 524 | 286 | 140 | 472 | 196 |
| Elongation (%) | 500 | 450 | 330 | 270 | 550 | 400 |
| Tear[1] strength (kg/cm) | 111 | 89 | 57 | 34 | 72 | 26 |
| Compression set (%) | 23 | 17 | 24 | 8 | 20 | 0 |
| Bounce impact elasticity (%) | 65 | 64 | 72 | 71 | 73 | 78 |

[1]The test conditions are the same as that in Table 1.

What is claimed is:

1. A thermosetting urethane elastomer having improved heat resistance and compression set properties prepared from:
   (a) a prepolymer having isocyanate groups at terminal ends obtained by allowing p-phenylene diisocyanate to react with a compound having 2 or more active hydrogens, and
   (b) a curing agent selected from the group consisting of
      i. 1,4-bis(2-hydroxyethoxy)benzene and trimethylolpropane, and
      ii. 1,4-bis(2-hydroxyethoxy)benzene and a polyol having an isocyanurate ring.

2. A thermosetting urethane elastomer according to claim 1, wherein the polyol having isocyanurate ring is represented by the formula (1):

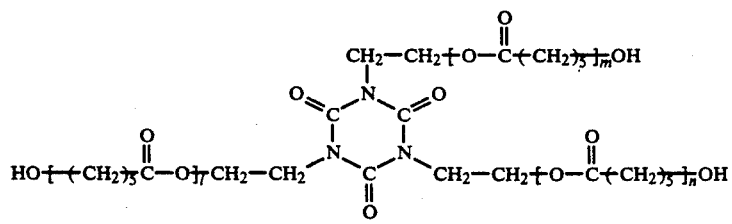

where $l$, $m$, $n = 0-1$, $0 \leq l+m+n \leq 3$.

3. A thermosetting urethane elastomer according to claim 1, wherein the content of isocyanate groups in the prepolymer is 2 to 20% by weight.

4. A thermosetting urethane elastomer according to claim 1, wherein the content of isocyanate groups in the prepolymer is 3 to 10% by weight.

5. A thermosetting urethane elastomer according to claim 1, wherein the NCO equivalent in the prepolymer:OH equivalent in the curing agents is 1:0.8 to 1:0.95.

6. A thermosetting urethane elastomer according to claim 1, wherein the mole ratio of 1,4-bis(2-hydroxyethoxy)benzene to trimethylolpropane is 9.5:0.5 to 1:9.

7. A thermosetting urethane elastomer according to claim 1, wherein the mole ratio of 1,4-bis(2-hydroxyethoxy)benzene to the polyol containing isocyanurate ring is 9.5:0.5 to 1:9.

8. A thermosetting urethane elastomer according to claim 1 wherein the compound having 2 or more active hydrogens has an average molecular weight of between 62 and 6000.

9. A thermosetting urethane elastomer according to claim 1 wherein the compound having 2 or more active hydrogens has an average molecular weight of between 1000 and 3000.

10. A thermosetting urethane elastomer according to claim 8 wherein the compound having 2 or more active hydrogens is selected from the group consisting of a polyester polyol, a polyether polyol, a polycarbonate polyol, a polyacrylic polyol and a polyamine.

11. A thermosetting urethane elastomer according to claim 10 wherein the compound having 2 or more active hydrogens is a polyester polyol.

12. A thermosetting urethane elastomer according to claim 11 wherein the polyester polyol is obtained by polycondensation of a glycol with a dibasic acid.

13. A thermosetting urethane elastomer according to claim 12 wherein the glycol is selected from the group consisting of ethylene glycol, 1,2-propylene glycol, 1,3-propylene glycol, 1,3-butylene glycol, 1,4-butylene glycol, 2,2-dimethyl-1,3 propane diol, diethylene glycol, 1,5-pentene diol, 3-methyl-1,5-pentane diol, 1,6-hexane diol, cyclohexane-1,4-diol, cyclohexane-1,4-dimethanol and the dibasic acid is selected from the group consisting of succinic acid, maleic acid, adipic acid, glutaric acid, pimellic acid, suberic acid, azelaic acid, sebacic acid, phthalic acid, isophthalic acid, terephthalic acid, hexahydrophthalic acid, hexahydroisophthalic acid, esters of the acids and halides of the acids.

14. A thermosetting urethane elastomer according to claim 10 wherein the polycarbonate polyol is obtained by reacting a carbonate which is selected from the group consisting of a dialkyl carbonate, a diaryl carbonate, and an alkylene carbonate with a hydroxyl compound.

15. A thermosetting urethane elastomer according to claim 14 wherein the hydroxyl compound is selected from the group consisting of 1,4-butylene glycol and 1,6-hexane diol.

16. A thermosetting urethane elastomer according to claim 10 wherein the polyester polyol is a lactone type polyol.

17. A thermosetting urethane elastomer according to claim 10 wherein the compound having 2 or more active hydrogens is a polyether polyol.

18. A thermosetting urethane elastomer according to claim 17 wherein the polyether polyol is a polytetramethylene glycol.

* * * * *